(12) United States Patent
Mickelat et al.

(10) Patent No.: US 10,589,196 B2
(45) Date of Patent: Mar. 17, 2020

(54) BAR-TYPE SCREEN CAGE

(71) Applicant: ANDRITZ FIEDLER GMBH, Regensburg (DE)

(72) Inventors: Thomas Mickelat, Nittenau (DE); Michael Reinstein, Teubliz (DE)

(73) Assignee: ANDRITZ FIEDLER GMBH, Regensburg (DE)

( * ) Notice: Subject to any disclaimer, the term of this patent is extended or adjusted under 35 U.S.C. 154(b) by 0 days.

(21) Appl. No.: 15/554,363

(22) PCT Filed: Feb. 25, 2016

(86) PCT No.: PCT/EP2016/000327
§ 371 (c)(1),
(2) Date: Aug. 29, 2017

(87) PCT Pub. No.: WO2016/142035
PCT Pub. Date: Sep. 15, 2016

(65) Prior Publication Data
US 2018/0043289 A1    Feb. 15, 2018

(30) Foreign Application Priority Data
Mar. 6, 2015   (DE) .................. 10 2015 003 020

(51) Int. Cl.
*B01D 29/11*   (2006.01)
*B01D 29/44*   (2006.01)
(Continued)

(52) U.S. Cl.
CPC ............ *B01D 29/111* (2013.01); *B01D 29/35* (2013.01); *B01D 29/445* (2013.01); *B07B 1/18* (2013.01);
(Continued)

(58) Field of Classification Search
None
See application file for complete search history.

(56) References Cited

U.S. PATENT DOCUMENTS

| 4,494,603 | A | * | 1/1985 | Harguindey | .......... B01D 29/111 |
|---|---|---|---|---|---|
| | | | | | 166/230 |
| 5,237,154 | A | | 8/1993 | Pellhammer et al. | |

(Continued)

FOREIGN PATENT DOCUMENTS

| DE | 12 53 236 | 11/1967 |
|---|---|---|
| DE | 27 47 148 | 4/1979 |

(Continued)

OTHER PUBLICATIONS

International Search Report issued by the European Patent Office in International Application PCT/EP2016/000327.

*Primary Examiner* — Benjamin M Kurtz
(74) *Attorney, Agent, or Firm* — Henry M. Feiereisen LLC

(57) ABSTRACT

A bar-type screen cage has profiled screen bars which are spaced apart in a circumferential direction. Multiple support arrangements which are spaced apart in an axial direction of the screen cage are fastened by welding to the profile bars at the outside. The screen bars, which are spaced apart in an axial direction, form screen slots between them. Each support arrangement includes at least two support wires which are closely spaced apart in the axial direction of the screen bars and which are fixed to the screen bars by resistance welding. The two support wires of each support arrangement and the profile bars-are fixedly connected to one another by way of an additional weld seam.

10 Claims, 3 Drawing Sheets

(51) Int. Cl.
*B01D 29/35* (2006.01)
*B07B 1/46* (2006.01)
*B07B 1/18* (2006.01)
*D21D 5/16* (2006.01)

(52) U.S. Cl.
CPC ............ *B07B 1/469* (2013.01); *B07B 1/4618* (2013.01); *D21D 5/16* (2013.01)

(56) References Cited

U.S. PATENT DOCUMENTS

| | | | |
|---|---|---|---|
| 5,718,826 A * | 2/1998 | Frejborg | D21D 5/16 210/402 |
| 6,021,905 A | 2/2000 | Frejborg | |
| 6,340,805 B1 * | 1/2002 | Ljokkoi | D21D 5/16 140/112 |
| 6,579,458 B2 | 6/2003 | Mickelat | |
| 6,589,424 B1 * | 7/2003 | Nieminen | B23K 31/02 210/497.01 |
| 8,292,086 B2 | 10/2012 | Mickelat et al. | |
| 9,593,449 B2 | 3/2017 | Mickelat et al. | |
| 2005/0224199 A1 | 10/2005 | Mickelat | |
| 2016/0144299 A1 | 5/2016 | Mickelat et al. | |

FOREIGN PATENT DOCUMENTS

| | | |
|---|---|---|
| DE | 33 27 422 | 2/1985 |
| EP | 0 062 867 | 10/1982 |
| EP | 0 432 448 | 11/1990 |
| EP | 0 929 714 | 3/2005 |
| EP | 2 098 272 | 9/2009 |
| WO | WO 97/20104 | 6/1997 |
| WO | WO 00/65151 | 11/2000 |
| WO | WO 02/097190 | 12/2002 |

* cited by examiner

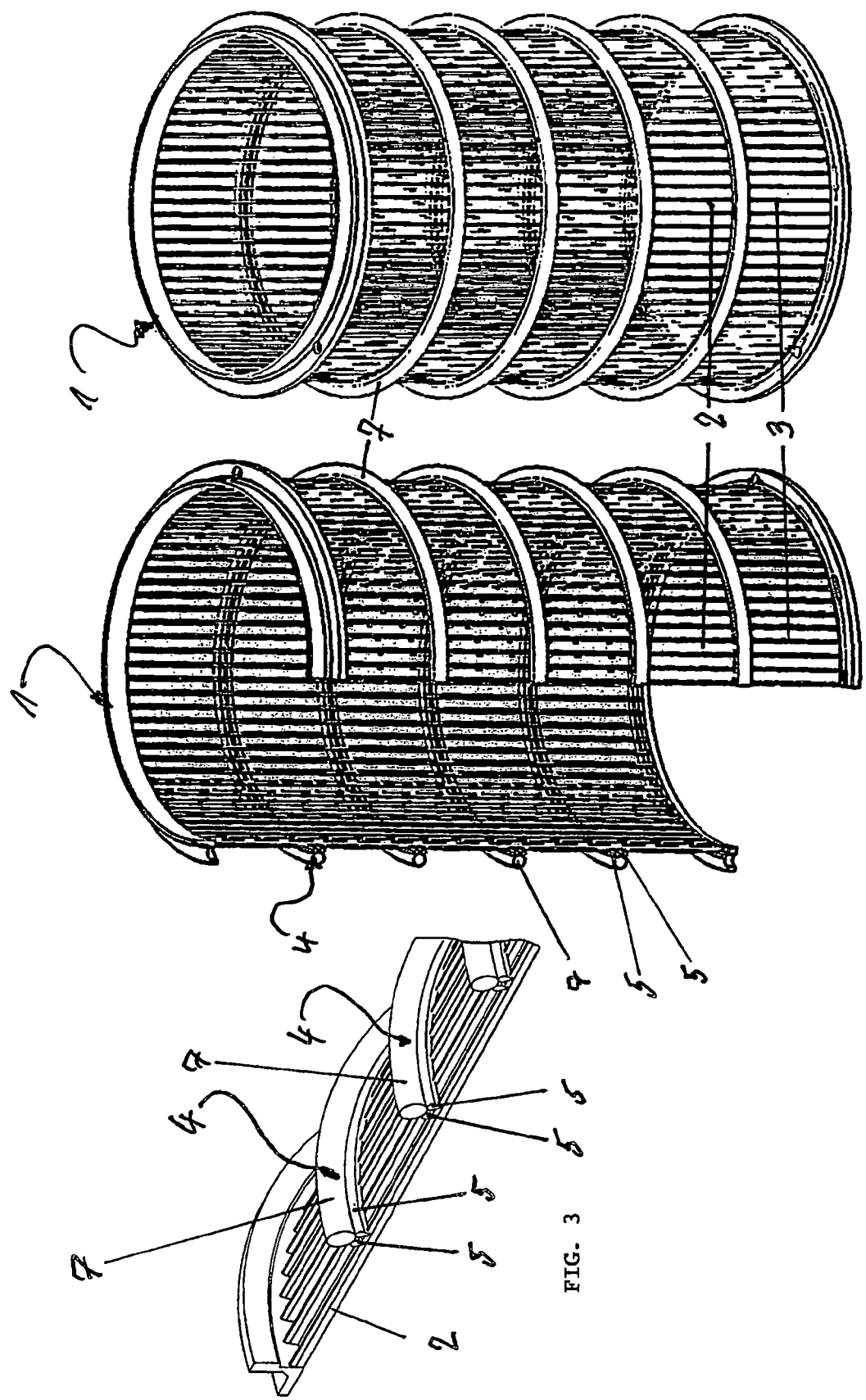

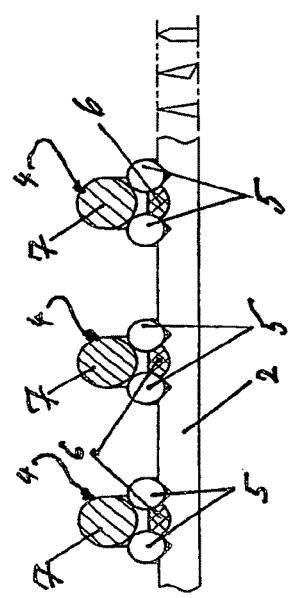
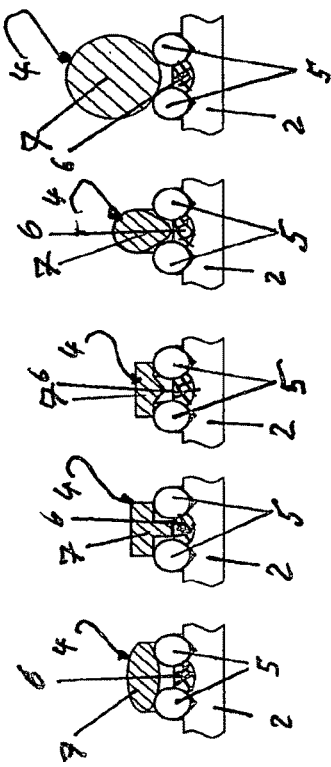
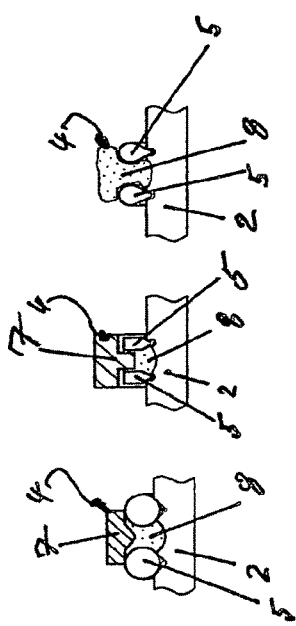
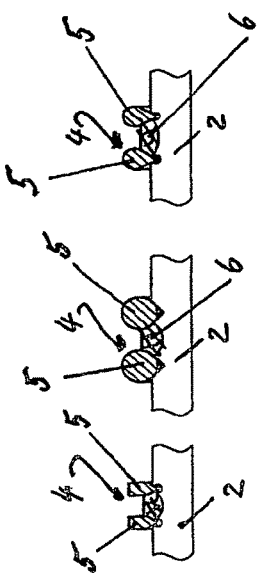
FIG. 4
FIG. 5
FIG. 6
FIG. 7

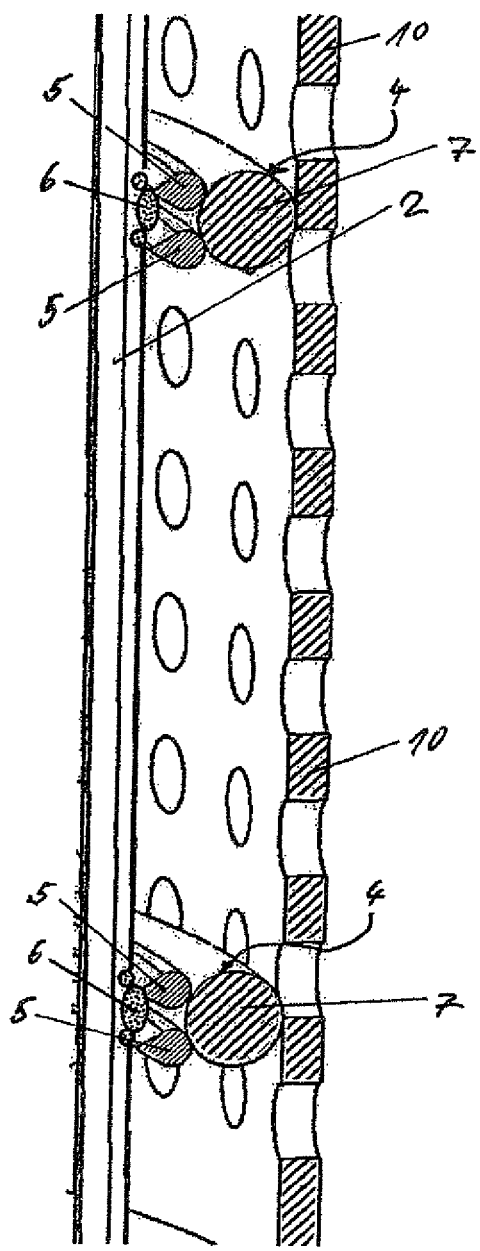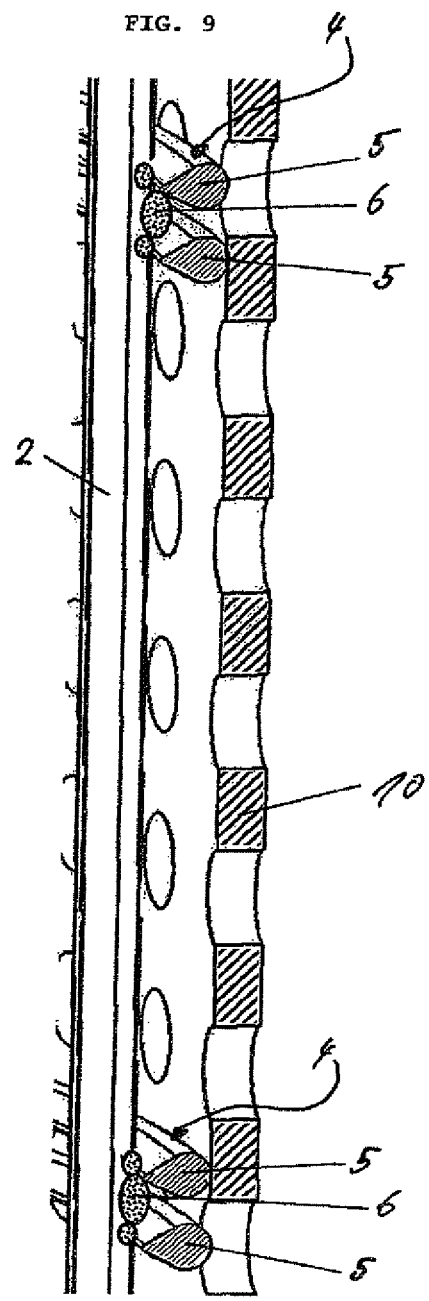

BAR-TYPE SCREEN CAGE

CROSS-REFERENCES TO RELATED APPLICATIONS

This application is the U.S. National Stage of International Application No. PCT/EP2016/000327, filed Feb. 25, 2016, which designated the United States and has been published as International Publication No. WO 2016/142035 and which claims the priority of German Patent Application, Serial No. 10 2015 003 020.5, filed Mar. 6, 2015, pursuant to 35 U.S.C. 119(a)-(d).

BACKGROUND OF THE INVENTION

The invention relates to a bar-type screen cage with profiled screen bars (profile bars) which are spaced apart in circumferential direction so as to form screen slots, wherein on the outside multiple support arrangements, which are spaced apart in axial direction, are fastened by means of welding, which support arrangements can for example be formed by support wires or support rings. Such a bar-type screen cage is known from WO 02/097 190 A1.

From EP 0 958 432 B1 a wire screen product, such as a screen plate or a screen cage is known, which is a resistance-welded screen construct. In this case the support wire is configured with two extensions for introducing a high current density, which noses become deformed, melt and fix the arrangement of support wire and profiled screen cage at two spaced apart defined welding points. This is intended to improve the stability and in particular the bending stability.

From EP 0 929 714 B2 a screen cage construct with a U-shaped reinforcement profile is known. The fixing is accomplished by deformation (embossment or bending) or by welding.

From U.S. Pat. No. 6,589,424 B1 a screen cage construct is known in which the profiled screen bar is positioned in a slotted U-profile part. An energy rich laser beam, which is radially guided from the outside, fixes the profiled screen bar and the U-shaped support wire.

In addition, further screen cage constructs are known from DE 33 27 422 A1, DE 27 47 148 A1 and EP 432 448 A1 in which besides resistance welding a soldering process is additionally used in order to minimize the adverse effect of the weld expulsion associated with resistance welding. During sorting of fiber suspensions the sharp-edged weld expulsion leads to spinnings and the formation of fiber clumps.

All currently known configurations of bar-type screen cages are very cost-intensive and it is in particular difficult to reliably reproduce predetermined slot widths.

SUMMARY OF THE INVENTION

The invention is based on the object to provide a simple and fast and thus cost-effective production of a bar-type screen cage, which also enables a reproducible slot width adjustment without strong slot width tolerances.

According to the invention for this purpose a bar-type screen cage with profiled screen bars (profile bars), which are spaced apart in circumferential direction for forming screen slots, is provided, wherein multiple support arrangements are fastened by means of welding on the screen bars so as to be spaced apart in axial direction, wherein the bar-type screen cage is characterized in that each support arrangement includes at least two support wires that are spaced apart at a small distance in axial direction of the screen bars and which are fastened on the screen bars by means of resistance welding, and that by means of an additional welding seam the two support wires of each support arrangement and the profile bars are fixedly connected with each other.

In the bar-type screen cage construct according to the invention the profiled screen bars are fixed by means of a support arrangement using resistance welding so as to form screen slots, wherein the support arrangement includes at least two support wires which are narrowly spaced apart in axial direction of the screen bars so that the desired slot width is reliably obtained. In order to achieve a stable and durable connection of support wires of each support arrangement with the profiled screen bar, an additional welding seam is provided which then fixedly connects the two support wires of each support arrangement and the profile bars with each other. In this way a bar-type screen cage according to the invention is obtained which possesses high stability and durability while at the same time enabling a cost-effective production using constructively simple components.

Preferably the additional welding seam is generated using a welding additive whereby the two support wires of each support arrangement and the profile bars are fixedly connected with each other by means of the welding additive. Hereby many different welding types can be used using a welding additive. This cost-effectively provides a very stable construction of a bar-type screen cage suited to withstand high stress conditions.

Preferably the distance between the support wires is 2 to 10 mm, preferably 4 to 10 mm. Similarly the support wires have a cross section of 6 $mm^2$, preferably of 10 $mm^2$ to 70 $mm^2$.

For increasing the stability of the bar-type screen cage a reinforcement ring can additionally be provided on the outside, which from fittingly interacts with the connection of support wires, profile bars and optionally filler material of the support arrangement. For example a fully solid reinforcement ring can be used which can be heated so that its inner diameter thermally expands, and can then be cooled causing it to shrink and thereby engage between the valleys formed between the two support wires of each support arrangement. This results in the desired from fit.

As an alternative a ring-shaped, optionally fiber reinforced, polymer layer can be provided for reinforcement. Such a ring-shaped polymer layer construct can then also be reliably positioned in a predefined manner in the valley between the two support wires of each support arrangement.

According to a further preferred embodiment the bar-type screen cage can be surrounded on its outside by a support sheath (back up sheath) with or without a reinforcement arrangement.

In summary, in the bar-type screen cage according to the invention it is important that each support arrangement includes at least two support wires that are spaced apart in axial direction of the screen bars and for predetermining the slot width fixing on the screen bars is performed by means of resistance welding. In order to provide the entire bar-type screen cage with a high stability an additional welding seam is provided which fixedly connects the two support wires of each support arrangement and the profile bars with each other. This results in a very durable connection between support wires of the support arrangement and the screen bars by means of an additional stabilizing welding seam.

BRIEF DESCRIPTION OF THE DRAWING

In the following the invention is explained in more detail by way of preferred non-limiting embodiments with reference to the included drawing. Herein it is shown in:

FIGS. 1, 2 and 3 a bar-type screen cage in the finished state, which is shown partially cut open in FIG. 2, with FIG. 3 showing an enlarged sectional view of a wall section of a bar-type screen cage, FIG. 4 a schematic sectional view for illustrating the connection of screen bars, support arrangement and a reinforcement ring, wherein this Figure also schematically shows profile cross sections as example for the profiled screen bars FIG. 5 schematic sectional views of embodiments with different configurations of reinforcement rings, which form fittingly interact with the support arrangements and their support wires, FIG. 6 schematic sectional views for illustrating embodiments in which the fixed connection between support wires of the support arrangement and the profiled screen bars is accomplished by means of polymer layers, and FIG. 7 schematic sectional views of connections of support arrangements with profiled screen bars without reinforcement ring.

FIGS. 8 and 9 show further embodiments of a bar-type screen cage with a support sheath arranged on the outside.

DETAILED DESCRIPTION OF PREFERRED EMBODIMENTS

In the Figures of the drawing same or similar parts are provided with the same reference numerals.

FIGS. 1 and 2 show a screen cage, overall designated with reference numeral 1, which has circumferentially spaced apart profiled screen bars (profile bars) 2, with screen slots 3 having a predetermined slot width being delimited between the screen bars. The screen cage 1 further includes multiple support arrangements, designated with reference numeral 4, which are spaced apart in axial direction of the screen cage 1 and are fastened on the outside on the screen bars 2 by means of welding. As can be seen in particular in FIG. 3 as enlarged section of the perspective views of FIGS. 1 and 2, each support arrangement 4 includes at least two support wires 5 that are spaced apart in axial direction of the screen bars 2. These support wires 5 are fastened on the screen bars by means of resistance welding. An additional welding seam, designated with reference numeral 6, is provided which fixedly connects the two support wires 5 of each support arrangement 4 with the profile bars or profiled screen bars 2.

As further shown in the perspective sectional view of FIG. 3, a reinforcement ring 7 is provided outside on the support arrangements 4 so that the reinforcement ring form fittingly interacts with the valley of each support arrangement 4 formed by the two support wires 5. This provides the bar-type screen cage 1 with good stability and great durability.

FIG. 4 illustrates in a sectional view an embodiment of a section of a bar-type screen cage according to FIG. 3. In addition, on the right hand side different profile cross sections that the screen bars 2 may have are shown as non-limiting examples.

FIG. 5 illustrates different embodiments of reinforcement rings 7, which form fittingly interact with the respective support arrangement 4 and the support wires 5 of the latter.

The additional welding seam 6 can preferably be generated by using a welding additive, wherein the additional welding seam 6 then fixedly connects the two support wires 5 of each support arrangement 4 and the profile bars 2 with the used welding additive.

Preferably the distance of the support wires 5 of each support arrangement 4 is 2 to 15 mm, in particular 4 to 10 mm. Advantageously the support wires 5 have a cross section of 6 mm$^2$ to 100 mm$^2$, preferably 10 mm$^2$ to 70 mm$^2$.

FIG. 6 shows embodiments in which the support wires 5 of each support arrangement 4 are connected with the respective profile bar or screen bar 2 by means of resistance welding. For fixedly connecting the two support wires 5 of each support arrangement 4 with the assigned screen bar 2 a polymer layer 8 is provided as an alternative to the reinforcement ring. In the two first embodiments, viewed from left to right in FIG. 6, a reinforcement ring 7, similar to FIG. 5, is additionally provided. In the third embodiment in FIG. 6 on the other hand at the far right position the polymer layer 8 also forms at the same time the reinforcement ring and this polymer layer 8 can optionally be fiber reinforced.

FIG. 7 schematically illustrates embodiments in which the support wires 5 of each support arrangement 4 are fixed on the respective screen bar or profile bar 2 by means of resistance welding and in this case only one further welding seam 6 is provided which fixedly and durably connects the support wires 5 of each support arrangement 4 with the profile bar 2. Therefore a reinforcement ring is absent in this exemplary embodiment.

FIG. 8 schematically shows a longitudinal sectional view of an embodiment in which in addition to the support arrangements 4 and the reinforcement rings 7 a support sheath 10 or back-up mantel is provided on the outside.

In the embodiment schematically shown in FIG. 9 the support sheath 10 surrounds the support arrangements 4 on the outside, without a reinforcement ring 7 being provided.

It is understood that the invention is not limited to the details described above, but that that a person skilled in the art may implement numerous changes and modifications without departing from the scope of the inventive idea. Thus in particular also more than two support wires 5 can be provided per support arrangement 4, wherein in this case also two further additional welding seams 6 can be present. Combinations of polymer mass 8 and additional welding seam 6 can also be provided. Also the respective support arrangements 4, which are arranged spaced apart in axial direction of the screen cage 1, can be configured different to each other.

According to the invention the bar-type screen cage 1 is configured so that it can be realized and produced cost-effectively. In addition the screen cage 1 according to the invention has a great stability and is very durable.

LIST OF REFERENCE NUMERALS

1 screen cage
2 screen bars (profile bars)
3 screen slots
4 support arrangement
5 support wires
6 additional welding seam
7 reinforcement ring
8 polymer layer
10 support sheath in FIG. 8 or FIG. 9

What is claimed is:
1. A bar-type screen cage, comprising:
    profiled screen bars spaced apart in circumferential direction of the bar-type screen cage so as to form screen slots;

support arrangements arranged on an outside of the profiled screen bars by welding and spaced apart in axial direction of the bar-type screen cage, each of said support arrangements having at least two support wires which are narrowly spaced apart in the axial direction of the profiled screen bars forming a valley between the at least two support wires, said at least two support wires being fastened on the profiled screen bars by resistance welding, said at least two support wires of each support arrangement and the profiled screen bars being fixedly connected with each other by only one additional welding seam, wherein the additional welding seam is generated by using a filler material and the at least two support wires of each support arrangement and the profiled bars are fixedly connected with each other by the filler material; and a reinforcement ring provided on an outside of the bar-type screen cage, wherein the reinforcement ring interacts with the at least two support wires and the profile bars in a form fitting manner such that the reinforcement ring extends into the valley between the at least two support wires.

2. The bar-type screen cage of claim 1, wherein the at least two support wires of each support arrangement are spaced apart by a distance of 2 to 15 mm.

3. The bar-type screen cage of claim 2, wherein the at least two support wires of each support arrangement are spaced apart by a distance of 4 to 10 mm.

4. The bar-type screen cage of claim 1, wherein the at least two support wires have a cross section of 6 mm$^2$ to 100 mm$^2$.

5. The bar-type screen cage of claim 4, wherein the at least two support wires have a cross section of 10 mm$^2$ to 70 mm$^2$.

6. The bar-type screen cage of claim 1, further comprising a support sheath externally surrounding the bar-type screen cage.

7. The bar-type screen cage of claim 1, wherein the reinforcement ring further interacts with the filler material for the additional welding seam.

8. The bar-type screen cage of claim 1, further comprising in addition to the additional welding seam a ring shaped polymer layer for reinforcement.

9. The bar-type screen cage of claim 8, wherein the ring shaped polymer layer is fiber reinforced.

10. The bar-type screen cage of claim 1, further comprising a support sheath surrounding the bar type screen cage on the outside.

* * * * *